United States Patent [19]
Arai et al.

[11] Patent Number: 5,635,578
[45] Date of Patent: Jun. 3, 1997

[54] PRIMER COMPOSITION

[75] Inventors: Masatoshi Arai; Hitoshi Kinami, both of Annaka; Yasushi Yamamoto, Takasaki, all of Japan

[73] Assignee: Shin-Etsu Chemical Co., Ltd., Tokyo, Japan

[21] Appl. No.: 644,818

[22] Filed: May 10, 1996

[30] Foreign Application Priority Data

May 12, 1995 [JP] Japan .................................. 7-138470

[51] Int. Cl.$^6$ .................................................. C08G 77/04
[52] U.S. Cl. ........................... 528/15; 515/104; 427/322; 427/387; 427/393.5; 427/407.1; 428/422; 106/287.16
[58] Field of Search ........................... 525/104; 428/422; 427/322, 387, 407.1; 106/287.16

[56] References Cited

U.S. PATENT DOCUMENTS

| | | | |
|---|---|---|---|
| 2,945,773 | 7/1960 | Panagrossi et al. | 428/422 |
| 4,100,136 | 7/1978 | Carter et al. | 528/41 |
| 4,719,262 | 1/1988 | Plueddemann | 525/105 |
| 4,795,775 | 1/1989 | Baile et al. | 524/379 |
| 5,554,689 | 9/1996 | Langstein et al. | 525/102 |

*Primary Examiner*—Ralph H. Dean
*Attorney, Agent, or Firm*—Oblon, Spivak, McClelland, Maier & Neustadt, P.C

[57] ABSTRACT

A primer composition containing (A) an organosilicon compound having a fluorine-containing organic group and having hydrogensilyl groups at both the terminals of the molecule and (B) a platinum group metal catalyst, and a method of modifying the surface of silicone rubber by using such a primer composition. This primer composition enables firm adhesion between a silicone rubber and a curable liquid fluorine rubber.

4 Claims, No Drawings

PRIMER COMPOSITION

BACKGROUND OF THE INVENTION

1. Field of the Invention

This invention relates to a primer composition, and more particularly to a primer composition suited for bonding curable liquid fluorine rubber to silicone rubber.

2. Description of the Prior Art

Silicone rubbers are used in many fields because of their good weatherability, heat resistance and electrical properties. Silicone rubbers, however, have a limit in their use because of their poor solvent resistance and chemical resistance. Accordingly, curable liquid fluorine rubber is now available as a promising material for modifying the surface of silicone rubber. This curable liquid fluorine rubber has a low viscosity before it cures, and is suited for coating. It cures upon heating at a temperature of about 150° C. after coating, to form a cured coat having a rubberlike elasticity. The cured coat thus obtained has good solvent resistance and chemical resistance.

However, the cured coat of the curable liquid fluorine rubber has a low adhesion to silicone rubber, and hence it has the disadvantage that only a low durability can be obtained in respect of solvent resistance and chemical resistance. Nevertheless, no primers useful for improving the adhesion between the liquid fluorine rubber and the silicone rubber are known in the art.

SUMMARY OF THE INVENTION

Accordingly, an object of the present invention is to provide a novel primer composition that enables firm adhesion between silicone rubbers and curable liquid fluorine rubbers.

The present invention provides a primer composition comprising as effective components (A) an organosilicon compound having a fluorine-containing organic group and having hydrogensilyl groups at both the terminals of the molecule and (B) a platinum group metal catalyst.

The primer composition of the present invention brings about a great improvement in adhesion between a silicone rubber and a curable liquid fluorine rubber. Hence, the silicone rubbers having good weatherability, heat resistance and electrical properties can be greatly improved also in the solvent resistance and chemical resistance in which they have been inferior. This more widens the use of silicone rubbers than ever.

DESCRIPTION OF THE PREFERRED EMBODIMENTS

(A) Organosilicon compound

The component-(A) organosilicon compound must have a fluorine-containing organic group and have hydrogensilyl groups at both the terminals of the molecule. The fluorine-containing organic group is a divalent organic group having at least one fluorine atom. Such an organic group may include fluoroalkylene groups, perfluoroalkylene groups, divalent fluoroalkylether groups and divalent perfluoropolyether groups. The greater the number of fluorine atoms contained in the fluorine-containing organic group is, the more greatly the modification can be effectively achieved. The organic group preferably includes a perfluoroalkylene group having 1 to 20 carbon atoms and a divalent perfluoropolyether group.

The hydrogensilyl group possessed by the component-(A) organosilicon compound is represented by the general formula:

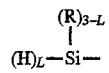

wherein R represents an alkyl group such as a methyl group, an ethyl group and a propyl group; and L represents an integer of 1 to 3.

R may preferably be a methyl group, and L may preferably be 1.

Preferred examples of the component-(A) organosilicon compound may include compounds represented by the general formula (1):

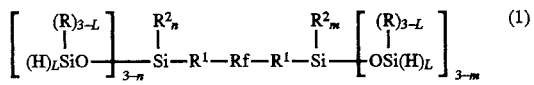

wherein R represents an alkyl group such as a methyl group, an ethyl group or a propyl group; L represents an integer of 1 to 3; Rf represents a divalent fluorine-containing organic group; $R^1$ may be the same or different and represents a divalent hydrocarbon group; $R^2$ each represents a substituted or unsubstituted monovalent hydrocarbon group; and m and n are each an integer of 0 to 2.

Preferred examples of the fluorine-containing organic group represented by Rf in the general formula (1) are divalent perfluoropolyether groups, perfluoroalkylene groups, and divalent groups comprised of a combination of a divalent perfluoropolyether group with a perfluoroalkylene group, specifically as exemplified by; —$CF_2CF_2$—, —$CF_2CF_2CF_2CF_2$—, —$C_8F_{16}$—, —$CF_2OCF_2$—, —$CF_2OCF_2CF_2OCF_2$— —$CF_2OCF(CF_3)OCF_2CF_2CF_2$—, —[$CF(CF_3)OCF_2$]$_3$[$CF_2OCF(CF_3)$]$_3$—, —[$CF(CF_3)OCF_2$]$_{10}$[$CF_2OCF(CF_3)$]$_{15}$— and —($CF_2O$)$_2$($CF_2CF_2O$)$_4$[$CF(CF_3)CF_2O$]($CF_2CF_2CF_2O$)—.

The divalent hydrocarbon group represented by $R^1$ may include, for example, alkylene groups having 1 to 8 carbon atoms such as an ethylene group and propylene group, and arylene groups having 6 to 12 carbon atoms such as a phenylene group and a group represented by the following chemical formula:

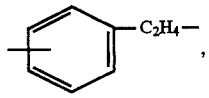

preferably including alkylene groups, and particularly preferably an ethylene group. The group represented by $R^2$ may include alkyl groups such as a methyl group, an ethyl group and a propyl group, and aryl groups such as a phenyl group. It preferably includes alkyl groups, and particularly preferably a methyl group.

The organosilicon compound represented by the general formula (1) can be produced, when, for example, $R^1$ is an ethylene group, in the following way. First, a fluorine-containing organic compound represented by the following general formula:

wherein Rf is as defined above;
is allowed to react with a compound represented by the following general formula:

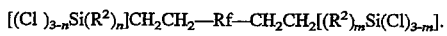

wherein $R^2$, n and m are as defined above;
in the presence of a platinum catalyst to synthesize a compound represented by the following general formula:

$$[(Cl)_{3-n}Si(R^2)_n]CH_2CH_2-Rf-CH_2CH_2[(R^2)_mSi(Cl)_{3-m}].$$

The compound thus obtained is hydrolyzed together with a compound represented by the following general formula:

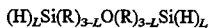

wherein R and L are as defined above; to obtain an organosilicon compound represented by the following general formula:

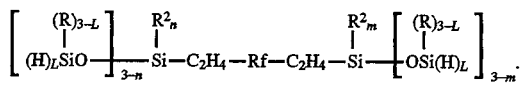

(B) Platinum Group Metal Catalyst

The component-(B) platinum group metal catalyst may include, for example, Rh, Pd, Pt and compounds thereof. In particular, platinum catalysts are preferred in view of an effect as primers, cost and so forth, including, for example, those comprising platinum black or platinum supported with a carrier such as alumina, silica or diatomaceous earth, chloroplatinic acid, and complexes of chloroplatinic acid with an alcohol, an ether, an aldehyde or an olefin such as ethylene. In particular, a complex of chloroplatinic acid with an olefin is preferred.

The component-(B) platinum group metal catalyst may be used in an effective amount as catalyst. Its optimum amount may be determined depending on the types of the silicone rubber and curable liquid fluorine rubber to which the primer composition is applied. In usual instances, it may be in an amount of 10 to 10,000 ppm, and more preferably 100 to 5,000 ppm, in terms of platinum metal, based on the weight of the component-(A) organosilicon compound.

Preparation of Primer Composition

The primer composition of the present invention can be readily prepared by dissolving or dispersing the component-(B) platinum group metal catalyst in the component-(A) organosilicon compound. Here, in order to adjust the viscosity of the composition to be obtained, an organic solvent may be optionally added. Such an organic solvent may include, for example, hydrocarbon type organic solvents such as hexane, toluene, xylene and rubber solvent, and fluorine type organic solvents such as methaxylene hexafluoride.

How to Use Primer Composition

There are no particular limitations on the combination of rubber and cured coat between which the primer composition of the present invention is used. In particular, the primer composition is useful for modifying the surface of the silicone rubber when a cured coat of the curable liquid fluorine rubber is formed on the surface of silicone rubber. The modification can be made by coating the surface of silicone rubber with the primer composition and then coating the resulting coated surface with the curable liquid fluorine rubber, followed by curing. More specifically, the surface of silicone rubber is coated with the composition of the present invention to form a coat. There are no particular limitations on the coating method, which may include brush coating, spray coating, and a method in which the silicone rubber is immersed in the primer composition. Next, the coat thus formed is dried at room temperature. Drying time may vary depending on the thickness of the coat. In usual instances, the coat may be dried for 10 to 20 minutes. Next, the coat thus dried is coated thereon with the curable liquid fluorine rubber. Then, the temperature is raised to a temperature necessary for the curing, to cause the liquid fluorine rubber to cure.

There are no particular limitations on the silicone rubber to be surface-modified, including, for example, peroxide-curable silicone rubbers of a millable type, condensation-curable room temperature-curable silicone rubbers, and addition-curable room temperature-curable silicone rubbers.

The curable liquid fluorine rubber used in the modification may preferably be those exhibiting at room temperature a low viscosity suited for coating, and capable of curing at a temperature of about 150° C. to turn into a rubberlike elastomer. Such a rubber is exemplified by SHIN-ETSU SIFEL 200 and 600 (trade name, available from Shin-Etsu Chemical Co., Ltd.).

The present invention will be described below in greater detail by giving Examples and Comparative Examples.

EXAMPLES 1 TO 10 & COMPARATIVE EXAMPLES 1 TO 4

The following organosilicon compounds A to F containing fluorine atoms, and organosilicon compound G containing no fluorine atoms were made ready for use.

A: $(HSiMe_2O)_3SiC_2H_4-[(CF(CF_3)OCF_2]_2[CF_2OCF(CF_3)]_2-C_2H_4Si(OSiMe_2H)_3$

B: $(HSiMe_2O)_2SiMeC_2H_4-CF_2OCF_2CF_2OCF_2-C_2H_4SiMe(OSiMe_2H)_2$

C: $(HSiMe_2O)_3SiC_2H_4-CF_2OCF(CF_3)OCF_2CF_2CF_2-C_2H_4Si(OSiMe_2H)_3$

D: $(HSiMe_2O)_3SiC_2H_4-C_2F_4-C_2H_4Si(OSiMe_2H)_3$

E: $(HSiMe_2O)_3SiC_2H_4-C_4F_8-C_2H_4Si(OSiMe_2H)_3$

F: $(HSiMe_2O)_3SiC_2H_4-C_6F_{12}-C_2H_4Si(OSiMe_2H)_3$

G: $(HSiMe_2O)_3SiC_2H_4-C_6H_{12}-C_2H_4Si(OSiMe_2H)_3$

In Examples and Comparative Examples, the component-(A) organosilicon compound, component-(B) platinum group metal catalyst and organic solvent as shown in Table 1 were mixed in the proportion as shown in Table 1 to obtain solutions of the respective primer compositions.

The primer composition solutions thus obtained were each coated on the surface of 10 cm×10 cm size silicone rubber KE555U (trade name, available from Shin-Etsu Chemical Co., Ltd.). Next, its surface thus coated was air-dried at room temperature for 15 minutes. Next, to the primer composition coated surface thus dried, a curable liquid fluorine rubber SHIN-ETSU SIFEL 600 (trade name, available from Shin-Etsu Chemical Co., Ltd.) was extruded in strings to allow the latter to adhere to the former, followed by heating at 150° C. Thus, slender and protruded (bead-like) cured products were formed on the primer composition coated surfaces.

Next, in order to test adhesion properties of the cured products thus obtained, it was tried to peel the cured products by pulling them in the vertical direction by hand. The adhesion properties were judged as good when the fluorine rubber coat was not peeled, and poor when the fluorine rubber coat was peeled with ease. Results obtained in the respective Examples and Comparative Examples are shown in Table 1.

TABLE 1

| | Component-(A) organosilicon compound | Component-(B) | (g) | | (g) | Solvent | (g) | Adhesion properties |
|---|---|---|---|---|---|---|---|---|
| Example 1 | A | 10 | Chloroplatinic acid solution (2 wt. %) in IPA* | | 0.1 | Hexane | 10 | Good |
| Example 2 | A | 10 | Chloroplatinic acid solution (2 wt. %) in IPA | | 1.0 | Hexane | 10 | Good |
| Example 3 | A | 10 | Pt/ethylene complex solution (2 wt. %) in ethanol | | 1.0 | Hexane | 5 | Good |
| Example 4 | B | 10 | Chloroplatinic acid solution (2 wt. %) in IPA | | 3.0 | Hexane | 10 | Good |
| Example 5 | C | 3 | Chloroplatinic acid solution (2 wt. %) in IPA | | 1.0 | Hexane | 10 | Good |
| Example 6 | D | 1 | Chloroplatinic acid solution (2 wt. %) in IPA | | 0.2 | Hexane | 10 | Good |
| Example 7 | E | 1 | Chloroplatinic acid solution (2 wt. %) in IPA | | 1.0 | Hexane | 10 | Good |
| Example 8 | F | 1 | Chloroplatinic acid solution (2 wt. %) in IPA | | 1.0 | Hexane | 10 | Good |
| Example 9 | F | 5 | Wilkinson's complex** | | | Hexane | 10 | Good |
| Example 10 | F | 10 | Pt/ethylene complex solution (2 wt. %) in ethanol | | 2.0 | Hexane | 10 | Good |
| Comparative Example 1 | F | 10 | — | | — | Hexane | 10 | Poor |
| Comparative Example 2 | — | | — Chloroplatinic acid solution (2 wt. %) in IPA | | 1.0 | Hexane | 10 | Poor |
| Comparative Example 3 | G | 10 | Chloroplatinic acid solution (2 wt. %) in IPA | | 0.5 | Hexane | 10 | Poor |
| Comparative Example 4 | G | 10 | Chloroplatinic acid solution (2 wt. %) in IPA | | 3.0 | Hexane | 10 | Poor |

*IPA: Isopropyl alcohol
**Wilkinson's complex: $(Ph_3P)_3RhCl$, 1,000 ppm (wherein Ph represents a phenyl group)

What is claimed is:

1. A primer composition consisting essentially of (A) an organosilicon compound having a fluorine containing organic group and having a hydrogen silyl group at both of the terminals of the molecule and (B) a platinum group metal catalyst, wherein said organosilicon compound is a compound represented by the general formula (1):

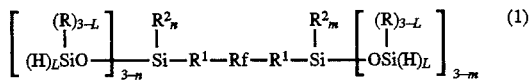

wherein R represents an alkyl group; L represents an integer of 1 to 3; Rf represents a divalent fluorine containing organic group; $R^1$ may be the same or different and represents a divalent hydrocarbon group; $R^2$ represents a substituted or unsubstituted monovalent hydrocarbon group; and m and n are each an integer of 0 to 2.

2. The primer composition according to claim 1, wherein said fluorine-containing organic group is selected from the group consisting of a divalent perfluoropolyether group, a perfluoroalkylene group, and a divalent group comprised of a combination of a divalent perfluoropolyether group with a perfluoroalkylene group.

3. The primer composition according to claim 1 or claim 2, wherein said R is a methyl group, said $R^1$ is an ethylene group and said $R^2$ is a methyl group.

4. A method of modifying the surface of silicone rubber, comprising coating the surface of the silicone rubber with said primer composition as defined in claim 1, and then coating the resulting coated surface with a curable liquid fluorine rubber, followed by curing.

* * * * *